(12) United States Patent
Oyamada et al.

(10) Patent No.: US 7,409,254 B2
(45) Date of Patent: Aug. 5, 2008

(54) DATA MANAGEMENT SYSTEM AND TRACE SYSTEM

(75) Inventors: Osamu Oyamada, Kawasaki (JP); Takashi Matsuura, Kawasaki (JP); Hiroyuki Kishimoto, Yokohama (JP); Mitsuhiro Sato, Yokohama (JP); Yoshitaka Miki, Osaka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/289,018

(22) Filed: Nov. 29, 2005

(65) Prior Publication Data
US 2006/0287749 A1  Dec. 21, 2006

(30) Foreign Application Priority Data
Jun. 17, 2005  (JP) ............................. 2005-178470

(51) Int. Cl.
*G06F 19/00* (2006.01)
*G06F 17/00* (2006.01)

(52) U.S. Cl. ........................... 700/97; 700/96; 700/105; 700/107; 707/104.1; 715/229

(58) Field of Classification Search ............. 700/95–98, 700/105–107, 180, 182; 715/511, 811, 814, 715/961, 964, 229, 230, 231; 707/203, 104.1
See application file for complete search history.

(56) References Cited

U.S. PATENT DOCUMENTS

| 5,311,438 A * | 5/1994 | Sellers et al. ................. 700/96 |
| 6,295,513 B1 * | 9/2001 | Thackston ..................... 703/1 |
| 2003/0177024 A1 * | 9/2003 | Tsuchida et al. ................ 705/1 |

FOREIGN PATENT DOCUMENTS

| JP | 7-271642 | 10/1995 |
| JP | 7-272122 | 10/1995 |
| JP | 2004-178170 | 6/2004 |

* cited by examiner

*Primary Examiner*—Sean P Shechtman
(74) *Attorney, Agent, or Firm*—Greer, Burns & Crain, Ltd.

(57) ABSTRACT

A design data management program directs a computer to perform a procedure of converting design data generated at a designing side to a data format applicable to a production side and transmitting the data to the production side, and a procedure of converting the data to data described in a predetermined language and storing the data in the storage device when a notification of a change of the design data is received from the production side.

5 Claims, 10 Drawing Sheets

- PARTS MASTER: TABLE FOR MANAGEMENT OF MASTER INFORMATION ABOUT PARTS
- PARTS STRUCTURE: TABLE FOR MANAGEMENT OF STRUCTURE OF PARTS

FIG. 5

| DESIGN CHANGE REQUEST DATE | UPPER PART CODE | Seq. No. | NUMERATOR OF QUANTITY | DENOMINATOR OF QUANTITY | UNIT OF QUANTITY | STARTING YEAR, MONTH, AND DAY | ENDING YEAR, MONTH, AND DAY | REASON FOR DESIGN CHANGE |
|---|---|---|---|---|---|---|---|---|
| 2005/3/5 | PX001022 | 4 | 6 | 1 | ONE PIECE | 2005/4/15 | 2005/6/20 | DESIGN FAILURE |
| 2005/3/5 | SD048961 | 3 | 3 | 1 | ONE PIECE | 2005/4/15 | 2005/6/20 | DESIGN FAILURE |
| 2005/3/5 | RD898900 | 2 | 4 | 1 | ONE PIECE | 2005/4/15 | 2005/6/20 | DESIGN FAILURE |
| 2005/4/5 | PX001022 | 4 | 6 | 1 | ONE PIECE | 2005/5/8 | 2005/6/20 | DELATED PARTS |
| 2005/4/5 | SD048962 | 3 | 3 | 1 | ONE PIECE | 2005/5/8 | 2005/6/20 | DELATED PARTS |
| 2005/4/5 | RD898901 | 2 | 4 | 1 | ONE PIECE | 2005/5/8 | 2005/6/20 | DELATED PARTS |
| 2005/4/28 | PX001022 | 4 | 6 | 1 | ONE PIECE | 2005/5/20 | 2005/6/20 | DELATED PARTS |
| 2005/4/28 | SD048963 | 3 | 3 | 1 | ONE PIECE | 2005/5/20 | 2005/6/20 | DELATED PARTS |
| 2005/4/28 | RD898900 | 2 | 4 | 1 | ONE PIECE | 2005/5/20 | 2005/6/20 | DELATED PARTS |
| 2005/6/1 | PX001022 | 4 | 6 | 1 | ONE PIECE | 2005/6/10 | 2005/6/20 | COST REDUCTION |
| 2005/6/1 | SD048961 | 3 | 3 | 1 | ONE PIECE | 2005/6/10 | 2005/6/20 | COST REDUCTION |
| 2005/6/1 | RD898902 | 2 | 4 | 1 | ONE PIECE | 2005/6/10 | 2005/6/20 | COST REDUCTION |
| 2005/6/3 | PX001022 | 4 | 6 | 1 | ONE PIECE | 2005/6/10 | 2005/6/20 | DEFECTIVE DESIGN |

CHANGED PORTION IN FACTORY B ↓ (at row with SD48861)

| DESIGN CHANGE REQUEST DATE | UPPER PART CODE | Seq. No. | NUMERATOR OF QUANTITY | DENOMINATOR OF QUANTITY | UNIT OF QUANTITY | STARTING YEAR, MONTH, AND DAY | ENDING YEAR, MONTH, AND DAY | REASON FOR DESIGN CHANGE |
|---|---|---|---|---|---|---|---|---|
| 2005/3/5 | PX001022 | 4 | 6 | 1 | ONE PIECE | 2005/4/15 | 2005/6/20 | DESIGN FAILURE |
| 2005/3/5 | SD048961 | 3 | 3 | 1 | ONE PIECE | 2005/4/15 | 2005/6/20 | DESIGN FAILURE |
| 2005/3/5 | RD898900 | 2 | 4 | 1 | ONE PIECE | 2005/4/15 | 2005/6/20 | DESIGN FAILURE |
| 2005/4/5 | PX001022 | 4 | 6 | 1 | ONE PIECE | 2005/5/8 | 2005/6/20 | DELEATED PARTS |
| 2005/4/5 | SD048962 | 3 | 3 | 1 | ONE PIECE | 2005/5/8 | 2005/6/20 | DELEATED PARTS |
| 2005/4/5 | RD898901 | 2 | 4 | 1 | ONE PIECE | 2005/5/8 | 2005/6/20 | DELEATED PARTS |
| 2005/4/6 | SD48861 | 2 | 4 | 1 | ONE PIECE | 2005/5/8 | 2005/6/20 | CHANGE IN FACTORY |
| 2005/4/28 | PX001022 | 4 | 6 | 1 | ONE PIECE | 2005/5/20 | 2005/6/20 | DELEATED PARTS |
| 2005/4/28 | SD048963 | 3 | 3 | 1 | ONE PIECE | 2005/5/20 | 2005/6/20 | DELEATED PARTS |
| 2005/4/28 | RD898900 | 2 | 4 | 1 | ONE PIECE | 2005/5/20 | 2005/6/20 | DELEATED PARTS |
| 2005/6/1 | PX001022 | 4 | 6 | 1 | ONE PIECE | 2005/6/10 | 2005/6/20 | COST REDUCTION |
| 2005/6/1 | SD048961 | 3 | 3 | 1 | ONE PIECE | 2005/6/10 | 2005/6/20 | COST REDUCTION |
| 2005/6/1 | RD898902 | 2 | 4 | 1 | ONE PIECE | 2005/6/10 | 2005/6/20 | COST REDUCTION |
| 2005/6/3 | PX001022 | 4 | 6 | 1 | ONE PIECE | 2005/6/10 | 2005/6/20 | DEFECTIVE DESIGN |

|  | DESIGN FAILURE | DELETED PARTS | COST REDUCTION | DEFECTIVE DESIGN |
|---|---|---|---|---|
| GRAPHIC BOARD | 20 | 5 | 0 | 4 |
| HARD DISK | 15 | 25 | 40 | 0 |
| POWER SUPPLY UNIT | 10 | 14 | 0 | 0 |
| OTHERS | 9 | 21 | 0 | 1 |
| TOTAL | 54 | 65 | 40 | 5 |

F I G. 8

|  | DESIGN FAILURE | DELETED PARTS | COST REDUCTION | DEFECTIVE DESIGN |
|---|---|---|---|---|
| APRIL | 10 | 35 | 10 | 1 |
| MAY | 8 | 21 | 0 | 1 |
| JUNE | 10 | 5 | 0 | 1 |
| JULY | 0 | 0 | 0 | 0 |
| AUGUST | 0 | 2 | 20 | 0 |
| SEPTEMBER | 26 | 2 | 10 | 2 |
| TOTAL | 54 | 65 | 40 | 5 |

DATA MANAGEMENT SYSTEM AND TRACE SYSTEM

BACKGROUND OF THE INVENTION

1. Field of the Invention

The present invention relates to design data management system, and more specifically to a design data management program for management of not only the design data generated at a designing side, but also the design change data generated at a producing side, for example, a factory, for the design data as data described in a predetermined language, for example, the XML (extensible markup language), and a design data trace program for reading data managed as described above in response to an external request, and displaying as a design data change history the result of retrieval under a given retrieval condition.

2. Description of the Related Art

Recently, using a system such as PDM (product data management), PLM (product lifecycle management), etc. as design data management system, a system of centrally managing various types of engineering data from concept design to general production has been widespread.

Conventionally, at the designing side, that is, in the design system, the time of the design data generated when a new design is used or when a design change is made passes when control is passed to the production side in a factory, for example, the production management division. In the production management division, only the data required in the factory is extracted, and other data is not stored. Therefore, when other design data is required in the factory, the data stored at the design system side is referenced, and the contents have to be confirmed with the manual.

Although production is performed in a factory based on the design data transmitted from the designing side, and, for example, a part to be used in the design data is specified at the designing side, the part may not be used in the factory. For example, when a screw specified in a step cannot be used, another screw is used in the factory. Furthermore, when a specified screw can be used in the factory by obtaining it from, for example, companies A, B, and C, the substitute parts information about which parts are used cannot be obtained at, for example, the designing side. Including the substitute parts information, the design change data at the factory side has not been centrally managed.

That is, when a product is produced in a factory based on specific design data, the design data generated at the design division is transmitted to a plurality of factories, and a plurality of units configuring the product are produced in a plurality of factories, the design data can be uniquely changed or amended by each factory depending on the management level and the convenience of each factory. However, it has been difficult at the design system side to manage the design change data for each factory.

For example, when a product configured by a plurality of units designed by the respective design systems is produced, it is difficult to centrally manage the design data generated by the plurality of design systems in an existing database.

The conventional technologies relating to the above-mentioned design data management system are disclosed by the following documents.

Japanese Published Patent Application No. 7-271642 discloses an engineering information storage device capable of easily checking which version of the component was used in the past document generating process by storing as information data which version of data was used for which component when a document is generated by referring to data of components.

Japanese Published Patent Application No. 2004-178170 discloses a design data management system and program capable of easily converting data for obtaining production data from the design data by converting the design data to input data described in a predetermined format, converting the input data to integral data in a format in which the data can be easily converted to the production data, that is, the data described in the XML, and managing the resultant data.

However, there has still been the problem that the design change data used in each factory cannot be centrally managed including, for example, the substitute parts information although the conventional technologies disclosed by the above-mentioned documents are used.

SUMMARY OF THE INVENTION

The present invention has been developed to solve the above-mentioned problems, and aims at centrally managing the design change data including the substitute parts information used in each factory in addition to the design data generated at the designing side, and realizing correct trace of design data and design change data, for example, for each factory.

The design data management program according to the present invention is used by a computer in a system for producing the product at the production side based on the design data generated at the designing side. The program includes a procedure of converting the design data generated at the designing side to the data format applicable to the production side and transmitting the converted data to the production side, and converting the generated design data to data described in a predetermined language and storing the data in the storage device. In addition, the program also includes a procedure of converting the design change data to data described in the predetermined language, and storing the data in the storage device when receiving a change notification of design data generated at the designing side from the production side.

The design data trace program according to the present invention is used by a computer in a system for producing the product at the production side based on the design data generated at the designing side. The program includes a procedure of reading from a storage device both design data generated at the designing side and design change data applied at the production side to the design data, which are converted to data described in a predetermined language and stored in the storage device. Furthermore, the program also includes a procedure of retrieving the read data based on a given retrieval condition, and displaying the retrieval result as a design data change history on the screen of the display device.

DESCRIPTION OF THE PREFERRED EMBODIMENTS

Figure 1:
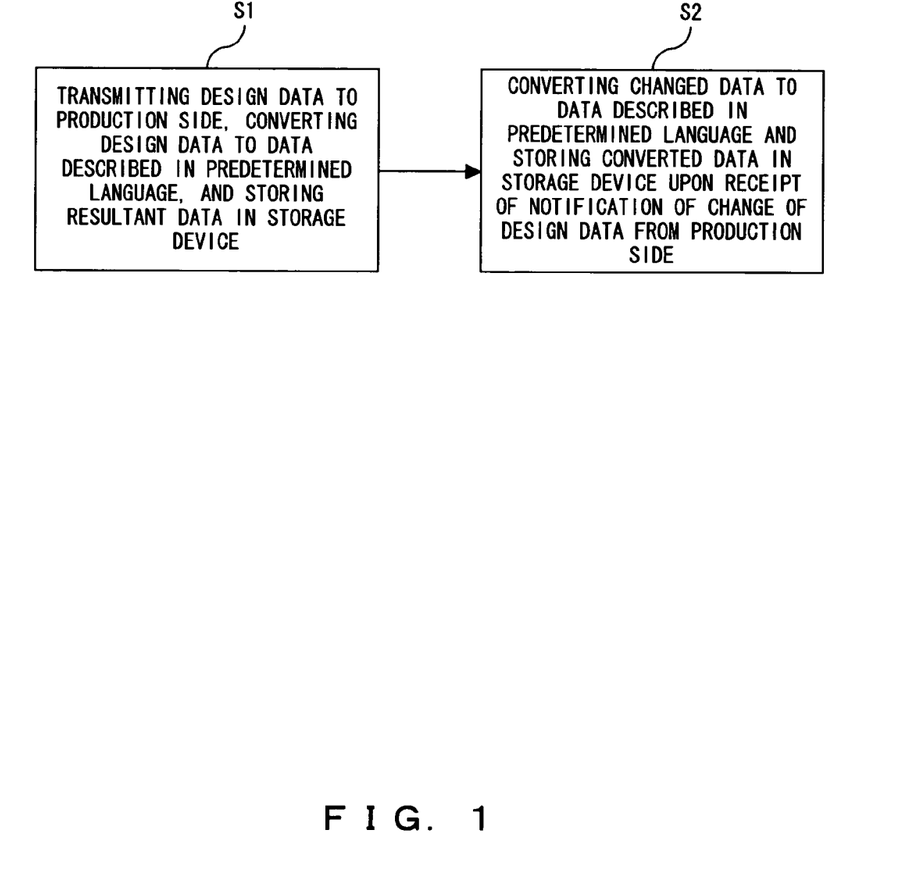
FIG. 1 is a block diagram of the function as the principle of the design data management program according to the present invention.

FIG. 1 is a block diagram of the function as the principle of the design data management program according to the present invention. FIG. 1 is a block diagram of the function as the principle of the design data management program used by a computer in a system in which a product is produced at a production side based on the design data generated at the designing side.

The design data management program according to the present invention performs a procedure of converting the design data generated at the designing side to the data format applicable to the production side and transmitting the converted data to the production side, and converting the generated design data to data described in a predetermined language and storing the data in the storage device in step S1 shown in FIG. 1, and a procedure of converting the design change data to data described in the predetermined language, and storing the data in the storage device when receiving a change notification of design data generated at the designing side from the production side in step S2.

In an embodiment of the present invention, the predetermined language can be an XML, and the data described in the XML can be stored in the above-mentioned storage device in a format in which a code of each part of a product is combined with master data as various types of data relating to the part.

The design data trace program according to the present invention is a program used by a computer in a system as described above to direct a computer to perform the procedure of reading from a storage device both design data generated at the designing side and design change data applied at the production side to the design data, which are converted to data described in a predetermined language and stored in the storage device, and the procedure of displaying the retrieval result based on a given retrieval condition to the read data on the screen of the display device as a design data change history. According to an embodiment of the present invention, the predetermined language can be an XML.

As described above, according to the present invention, in addition to the design data generated at the designing side, the design change data obtained at the production side can be centrally managed, and, for example, the design change data can be traced as a change history for each factory.

According to the present invention, the design data and the design change data including the design change data changed in each factory can be centrally managed, and, for example, a design change history of each factory can be traced.

By describing the data to be centrally managed in the XML, the difference in data format between a plurality of design systems can be accepted, and when there are data items in the design data added in the future, it can be accepted by adding the XML data, thereby removing the necessity to restructure the database.

Figure 2:
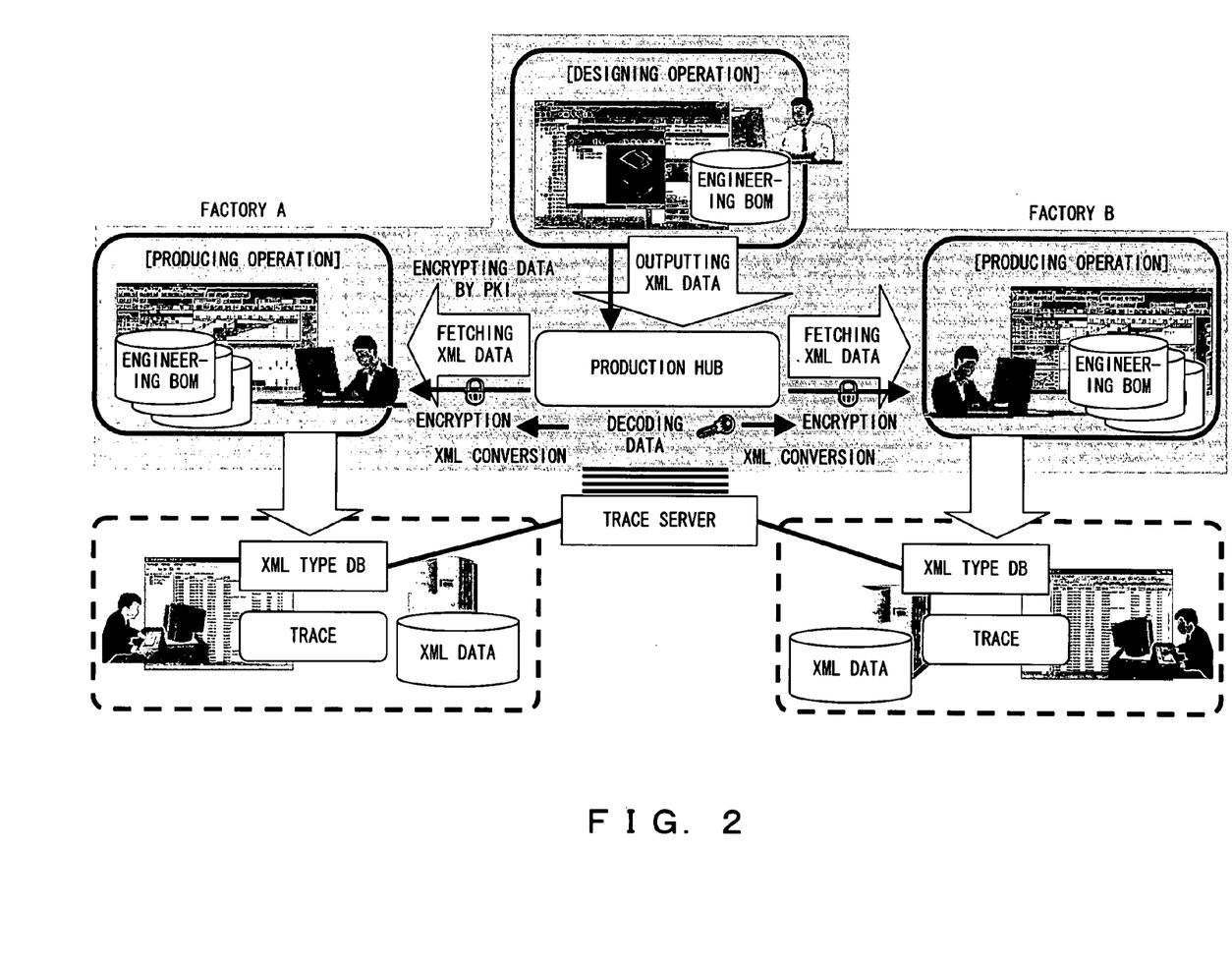
FIG. 2 shows the entire configuration of the system in the design data management system and trace system according to the present invention.

FIG. 2 is an entire explanatory view of the design data management system and the design data trace system according to the present invention. In FIG. 2, the engineering BOM (bill of materials) corresponding to the engineering bill of materials generated by the designing operation is output as, for example, XML data to the production HUB for performing management of design data and necessary conversion.

The data is transmitted after, for example, encrypted as XML data to a normally plurality of factories required to produce products, that is, the factories A and B in this example, and used in producing products as the engineering BOM in the producing operation in each factory, and stored in an XML type database directly connected to each factory.

At this time, when it is necessary to change the design data generated by the designing operation in each factory, the design change data is also stored in the XML type database, thereby allowing the trace server for tracing design data to refer to the stored contents of the XML type database directly connected to each factory, and trace the design data change history for each factory.

In the embodiment described later, the design data generated in the designing operation, and the design change data as a result of making a change to the design data at each factory are stored by, for example, the HUB system in one database, and the trace server can output the design change history for each factory by retrieving the stored contents of the database. In this case, the design change data as a result of a change made by each factory to the design data generated in the designing operation is transmitted from each factory to the HUB system, and the design change data is converted by the HUB system to data described in, for example, the XML, and centrally managed. For example, in FIG. 2, the design data output from the designing operation is defined as XML data, but it is not always necessary that the data is described in the XML.

Figure 3:
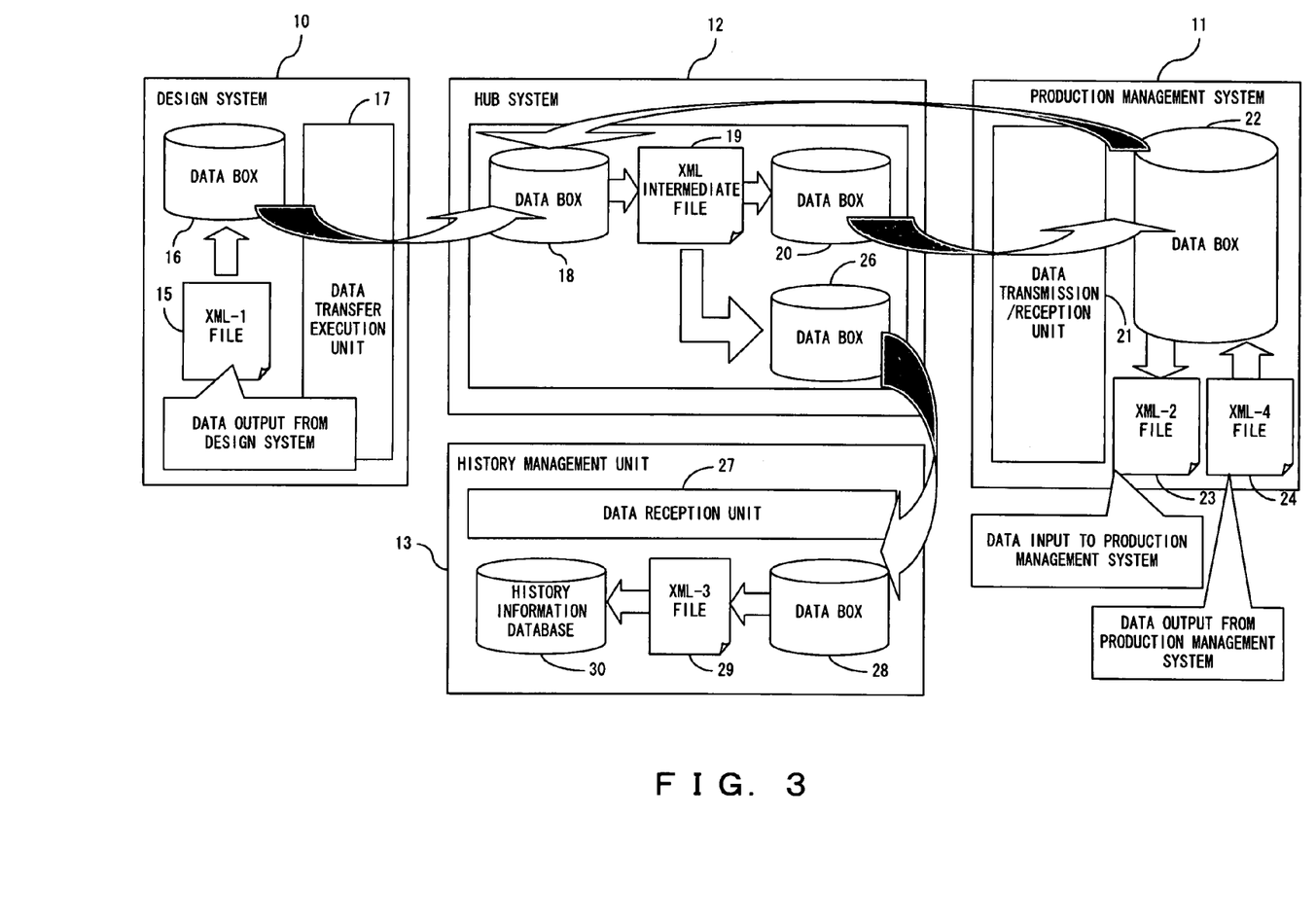
FIG. 3 is an explanatory view of the flow of new design data and design change data according to an embodiment of the present invention.

FIG. 3 is an explanatory view of the flow of design data and design change data according to the present embodiment. In FIG. 3, a production HUB system 12 which corresponds to the production HUB shown in FIG. 2 and is used in transferring and converting data is provided between a design system 10 for generating design data and a production management system 11 for fetching the design data at a factory side. The HUB system 12 stores design data and design change data, and a history management unit 13 for managing a design change history is provided.

The HUB system 12 basically performs a process as a server for transferring and converting data when passing to the production management system 11 new design data output from the design system 10 and difference data between the original design data when a design change is made. The HUB system 12 transmits design change data including new design data to the history management unit 13 and accumulates the data therein. The physical memory for accumulation of the data can be a local device or a remote device to the HUB system 12.

In FIG. 3, the data generated by the design system 10 is stored in a data box 16 as an XML-1 file 15, and is transmitted to the HUB system 12 by a data transfer execution unit 17.

In the HUB system 12, the data transmitted from the design system 10 is stored in a data box 18, converted to, for example, an XML intermediate file 19, and is stored in a data box 20. The data stored in the data box 20 is converted to an XML-2 file 23 as data applicable to, for example, the production management system 11, and is transmitted to the production management system 11.

In the production management system 11, the data of the XML-2 file 23 transmitted from the HUB system 12 and received by a data transmission/reception unit 21 is stored in a data box 22, and the file is output to, for example, a factory.

In the HUB system 12, the design data transmitted from the design system 10 as the contents of the XML intermediate file 19, or design change data is converted to an XML-3 file 29 in a format applicable in central management and trace, and is stored in a data box 26, and the data is transmitted to the history management unit 13. In the history management unit 13, the data transmitted from the HUB system 12 is received by a data reception unit 27, and stored in a data box 28. Then, it is stored in a history information database 30 as the XML-3 file 29 in the format applicable for management of the history of design data and design change data.

At the production management system 11, for example, in consideration of data management and procurement of parts in a factory, when the contents of the design data transmitted from the design system 10, that is, the contents of the data of the XML-2 file 23 are changed, the changed data is stored in the data box 22 as a XML-4 file 24, and then it is transmitted by the data transmission/reception unit 21 to the HUB system 12.

In the HUB system 12, the design change data is stored in the data box 18, and is converted to the XML intermediate file 19 as the above-mentioned design data generated by the design system 10 or the design change data, and is stored in the data box 26, converted to the XML-3 file 29, and is transmitted to the history management unit 13. Then, as described above, the history management unit 13 stores the design change data as the XML-3 file 29 in the history information database 30.

Thus, in addition to the design data output from the design system 10 and design change data, the design change data in the production management system 11, that is, in each factory is stored and centrally managed as the XML-3 file 29 in the history information database 30 in the history management unit 13.

Figure 4:
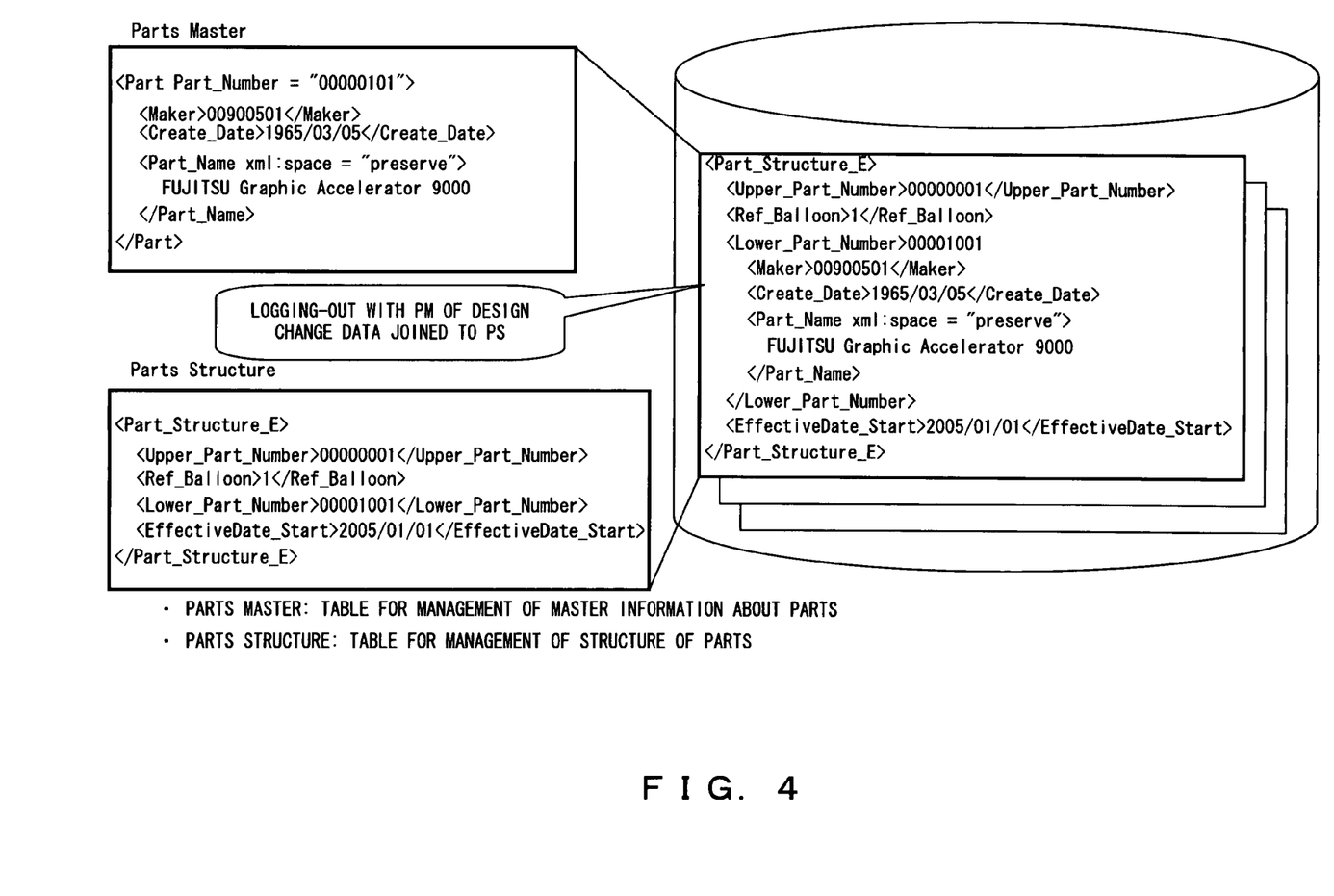
FIG. 4 is an explanatory view of the format of the data stored in the history information database.

FIG. 4 is an explanatory view of the data storage format in the history information database 30 shown in FIG. 3. In the present embodiment, the design data is managed as an XML type database in a format in which master information as various types of information about a part is combined with a part code of the part, for example, data of a part number. Thus, the design data to be stored in a plurality of tables of a normalized database can be managed as one record.

Generally, the parts information for producing a product is hierarchically managed. That is, the structure of the parts information about a product is hierarchically managed by determining, for example, what unit is required to generate a product, what parts are required for each unit, etc. The structure of an upper part and a lower part in the hierarchical structure is managed in a parts structure table, and the master information relating to a part specified by each parts code, for example, a parts number, is managed as a parts master table.

In the present embodiment, as shown in FIG. 4, in storing XML data in the history information database 30 shown in FIG. 3, the data of the parts master table is stored as combined with the data of the parts structure table, and is output as a log as necessary. That is, as shown on the right in FIG. 4, the data is stored in the history information database 30 in the format in which the data of the parts master table is included in the data of the parts structure table. Thus, for example, when data items are added in the future, a change in a data item can be accepted only by adding necessary data to the XML data stored in the format shown in FIG. 4, thereby removing the necessity to change the structure or restructure of a database in response to a change of a data item. For example, when a new design division is added to generate a part for supporting a bottle in addition to the design divisions of a bottle and a cap, it is not necessary to generate a new database for management of the data of the three parts.

Figure 5:
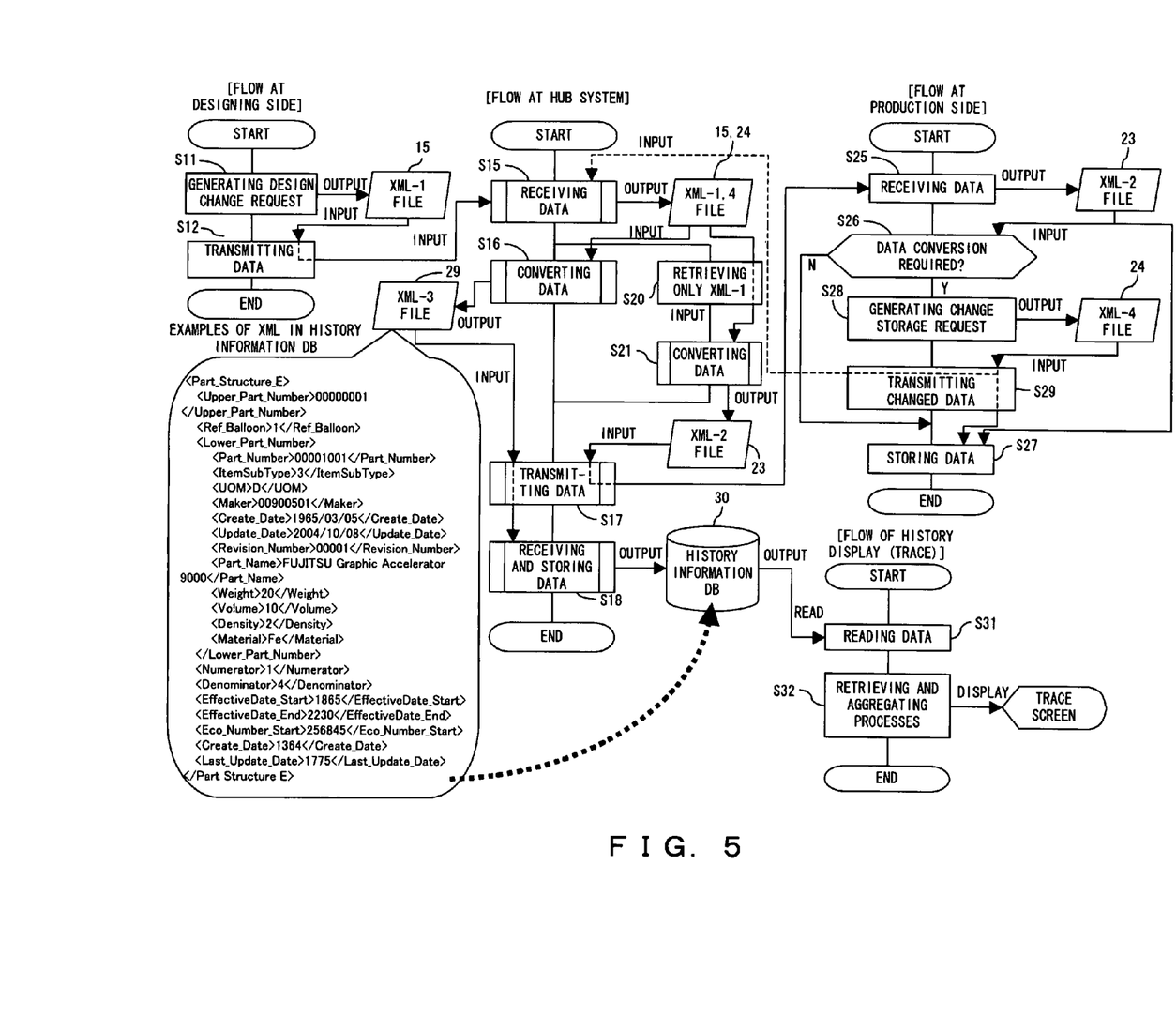
FIG. 5 is a flowchart of the process according to an embodiment of the present invention.

FIG. 5 is a detailed flowchart of the design data management and the tracing process according to an embodiment of the present invention. The process in the flowchart can be basically and roughly divided into a process of a designing side, a process of a HUB system, a process of a production side, and a tracing process, that is, a design change history displaying process. In FIG. 5, an arrow indicates a flow of data, and a process is naturally and sequentially performed downwards.

When a process is started at a designing side, new design data or design change data transmission request is generated in step S11, and the data is output as the XML-1 file 15. In step S12, data is transmitted to the HUB system using the XML-1 file 15 as input, thereby terminating the process.

At the HUB system side, data from the designing side is received in step S15, and the XML-1 file 15 is output. In step S15 as described later, the XML-4 file 24 as design change data transmitted from the production side can be received.

The XML-1 file 15 transmitted from the designing side is input to the data converting process in step S16, and, as a result, the data is output as the data format stored in the history information database 30 shown in FIG. 3, that is, as the XML-3 file 29 with the parts master data combined to the parts structure data as explained above by referring to FIG. 4, and is input to the data transmitting process in step S17. Then, for example, data is transmitted to a remote device, and the transmitted data is received in step S18, and is stored in the history information database 30.

In parallel with the above-mentioned process, in the HUB system, the contents of the XML-1 file 15 transmitted from the designing side are transmitted to the production side. That is, in the data received in step S15, only the XML-1 file 15 is retrieved in step S20, and input in the data converting process in step S21. Then, it is output as the XML-2 file 23 in the data format applicable to the process at the production side, input in the data transmitting process in step S17, and transmitted to the data production side. The first step in claim 1 of the present invention corresponds to the processes in steps S21 and S17, and the processes in steps S16 through S18.

At the production side, the data is received, and output as the XML-2 file 23. Using the XML-2 file 23 as input, it is determined in step S26 whether or not a change is required at the production side, that is, at the factory side on the data transmitted from the designing side. If a change is not required, the XML-2 file 23 is stored in the memory of the production side, thereby terminating the process.

When it is determined in step S26 that a change of data transmitted from the designing side is required, a request to store changed data is generated in step S28, and the contents are output as the XML-4 file 24. The file is input in the changed data transmitting process in step S29, transmitted to the HUB system side, and, for example, the contents of the XML-2 file 23 as the data from the designing side and the contents of the XML-4 file 24 indicating the changed data at the production side are stored in the memory at the production side in step S27, thereby terminating the process.

The XML-4 file as the design change data transmitted from the production side to the HUB system is received by the HUB system side in step S15, provided as input to the data converting process in step S16 as with the above-mentioned XML-1 file 15, converted to the XML-3 file 29 as the data format stored in the history information database 30, and stored in the history information database 30 in the processes in steps S17 and S18. The second step of claim 1 corresponds to the processes in steps S16 through S18.

Next, when the process is started in the flowchart of the tracing process, data is read from the history information database 30 in step S31. As described above, the history information database 30 can be a local device or a remote device to the HUB system, and data is output from the history information database 30, a retrieving and aggregating process is performed on the data output in step S32, and the result of the process is displayed on the trace screen as a design change history, thereby terminating the process. Thus, only by retrieving data from the design data and design change data accumulated in the history information database 30, with or without specifying an item, it is possible to display the trace of time-series design change data for each factory. By performing the tracing operation, the past configuration of the parts can also be restored.

Figure 6:
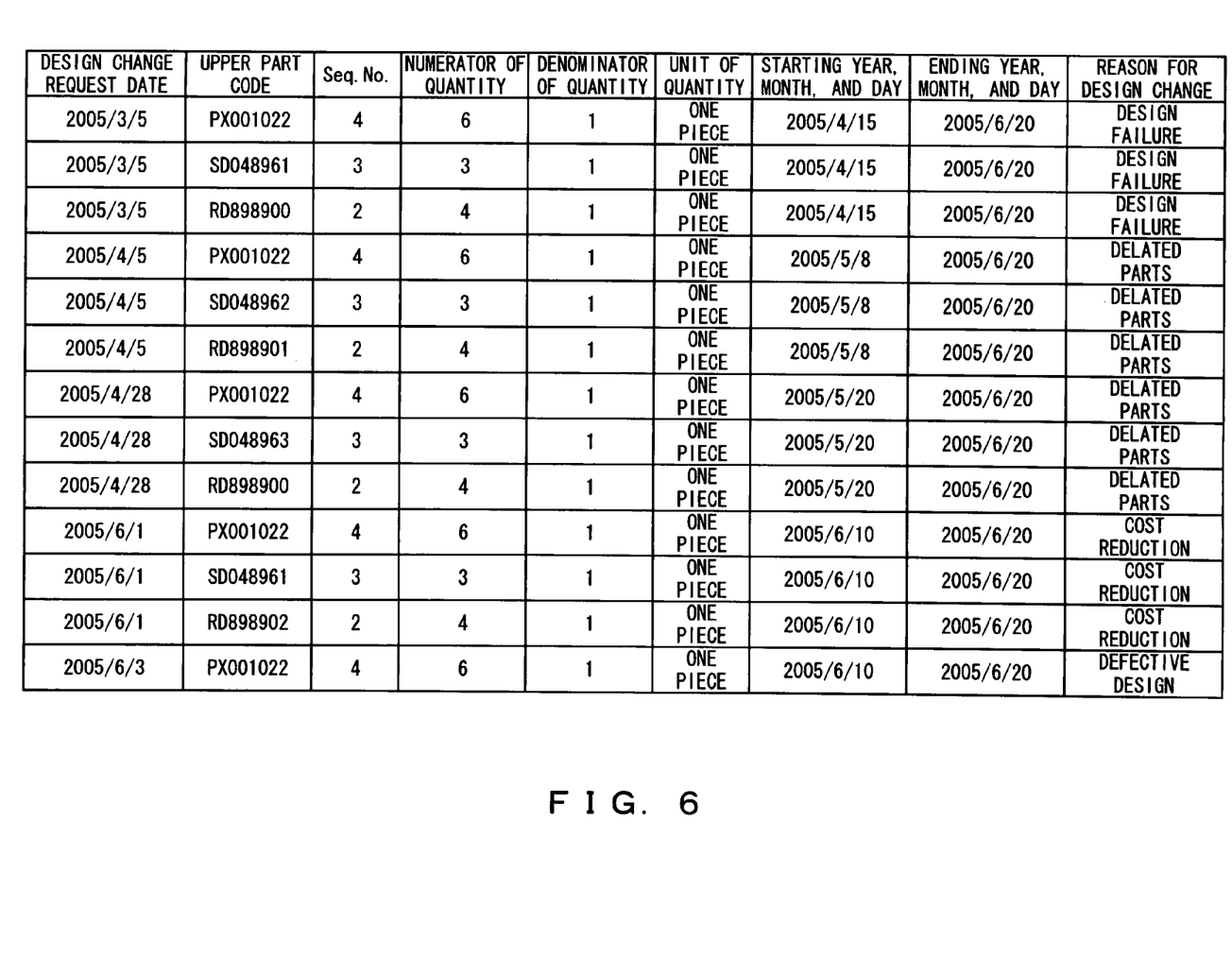
FIG. 6 shows the design change history in the factory A.
Figure 7:
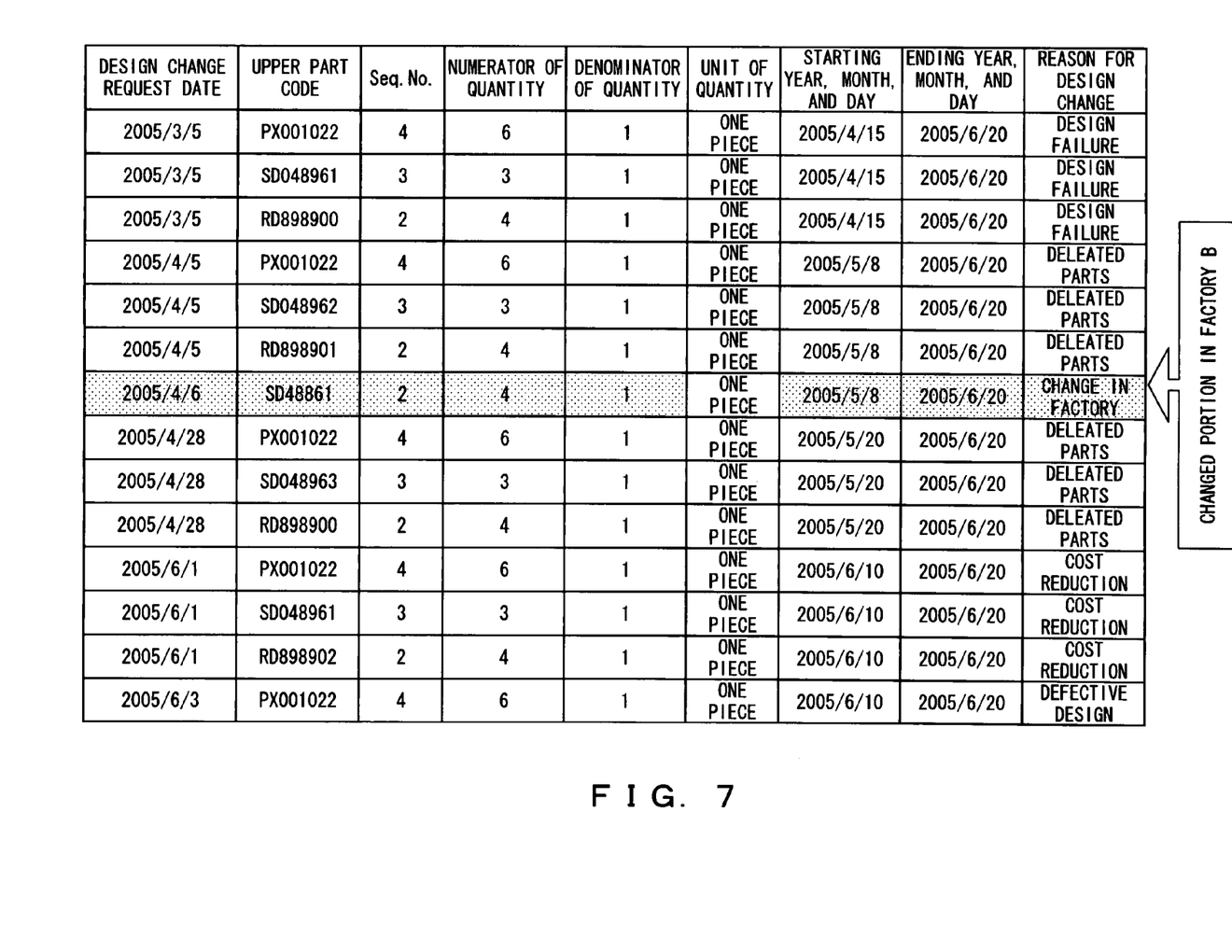
FIG. 7 shows the design change history in the factory B.

FIGS. 6 and 7 show an example of displaying design change history trace. The design change trace indicates the design change history of a specific lower part. FIG. 6 shows a change result in the factory A. FIG. 7 shows a change result in the factory B.

When FIGS. 6 and 7 are compared with each other, the contents are the same between them except the data in line 7 shown in FIG. 7, that is, the data of a changed portion in the factory B. That is, in the factory A, a design change is made only at an instruction from the designing side while a change of design data is made independently in the factory B in addition to the design change indicated by the designing side, and a result is announced as the XML-4 file 24 to the HUB system side.

Upper part codes shown in FIGS. 6 and 7 are codes as upper parts using specified lower parts, that is, parts to be traced, and a sequence number indicates the order of processes when a structure is performed at the factory side. A numerator/denominator of an amount refer to the number of necessary parts. The unit of quantity refers to the unit of the number of necessary parts. The starting year, month, and day indicates the starting date of a design change in a factory. The ending year, month, and day indicates the term of the design. These two pieces of data of year, month, and day have great influence on the capacity of required parts for arrangement of parts performed by the production management system.

Figure 8:
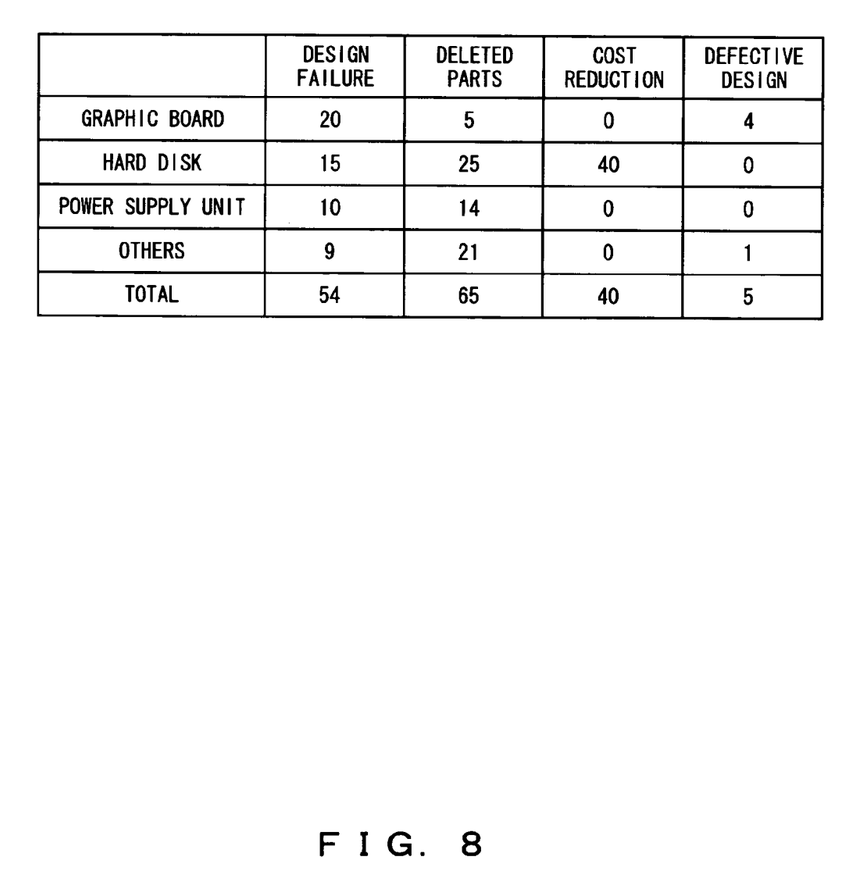
FIG. 8 shows a result of an aggregate (1) of design change reasons.
Figure 9:
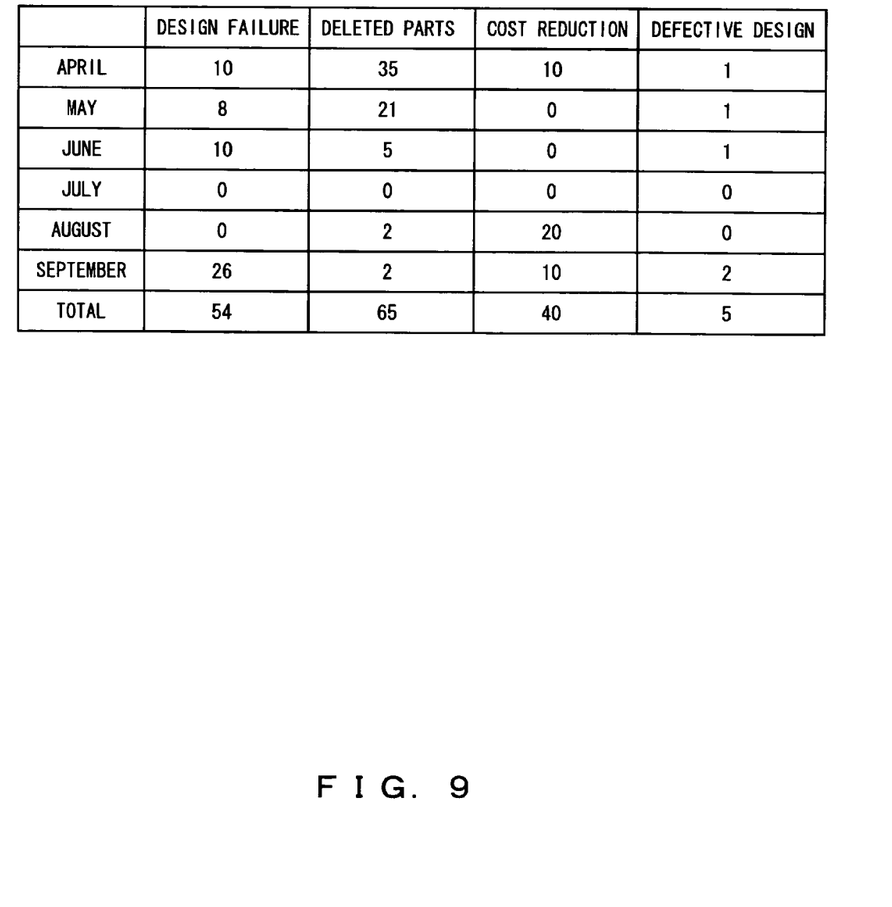
FIG. 9 shows a result of an aggregate (2) of design change reasons.

In the present embodiment, since all design data and design change data are centrally managed by the history information database 30 as described above, it is possible to perform an aggregating process on the design change data of an item by specifying the item as described above. FIGS. 8 and 9 show examples of results of the aggregating process of the design change reasons.

As shown in FIG. 8, the design change reasons are aggregated for each product. As shown in FIG. 9, the number of times of design changes made to a specific product is calculated for each month. Using the above-mentioned aggregating results, the production processes can be managed, thereby obtaining a large practical merit.

Figure 10:
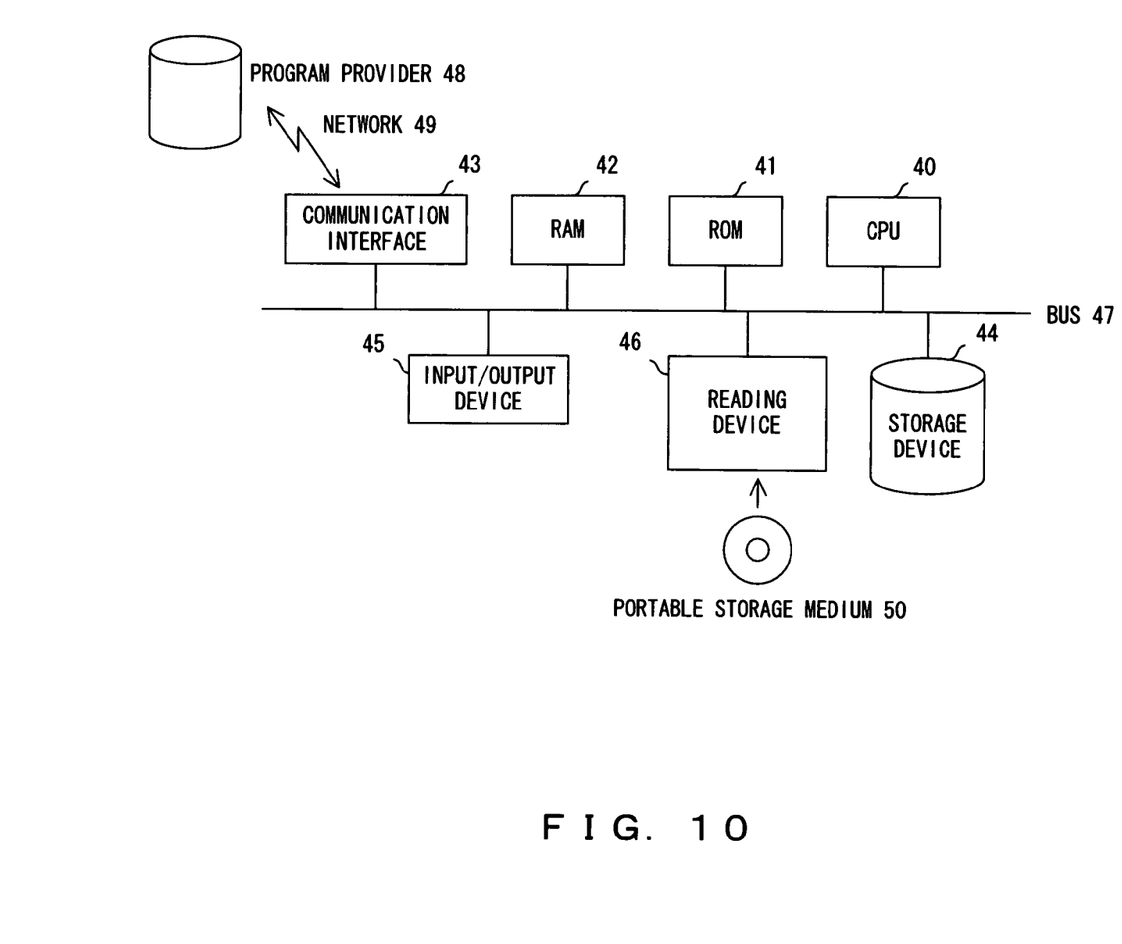
FIG. 10 is an explanatory view of loading a program for realizing the present invention into a computer.

As described above, the design data management program, the design data trace program, etc. according to the present invention are explained in detail. For example, the HUB system shown in FIG. 3 can be naturally configured by a general computer system as a basic component. FIG. 10 is a block diagram of the computer system, that is, a hardware environment.

In FIG. 10, the computer system comprises a central processing unit (CPU) 40, read only memory (ROM) 41, random access memory (RAM) 42, a communication interface 43, a storage device 44, an input/output device 45, a reading device 46 of a portable storage medium, and a bus 47 to which all these component are connected.

The storage device 44 can be various types of storage devices such as a hard disk, a magnetic disk, etc. These storage devices 44 or the ROM 41 store a program shown in the flowchart in FIG. 5, a program according to claim 1 in the scope of the claims of the present invention. By the programs executed by the CPU 40, the design data including the design change data made at a factory side according to the present embodiment can be centrally managed, and a change history can be correctly traced.

The above-mentioned program can be stored in the storage device 44 from a program provider 48 through a network 49 and the communication interface 43, stored in a marketed and distributed portable storage medium 50, set in the reading device 46, and executed by the CPU 40. The portable storage medium 50 can be various types of storage media such as CD-ROM, a flexible disk, an optical disk, a magneto optical disk, a DVD, etc. By the reading device 46 reading a program stored in the above-mentioned storage media, the design data can be centrally managed according to the present embodiment.

As explained above in detail, according to the present invention, newly designed data and design change data can be centrally managed, and a design change history can be correctly traced. For example, the data of substitute parts made in a factory can be referenced by other production divisions by accumulating the data as design change data. As a result, information conventionally lost in a division other than the factory that uses substitute parts can be retrieved. This is a new operation and very significant in various applications.

What is claimed is:

1. A computer-readable portable storage medium storing a design data management program to direct a computer to manage design data generated at a designing side of a product to be produced at a production side, including a plurality of producers, based on the design data, the program comprising:

a step of receiving from the designing side the design data generated at the designing side in a first format;

a step of converting the design data in the first format to design data in a second format that is applicable to the production side;

a step of transmitting the design data in the second format to each of the plurality of producers in the production side;

a step of converting the design data in the first format to design data in a third format that is described in a predetermined language;

a step of storing the design data in the third format in a storage device;

a step of receiving respectively from a first producer of the plurality of producers in the production side pieces of design change data in a fourth format that indicates a change independently made to the design data in the second format respectively by the first producer in producing the product, the product being produced by the first producer respectively with the design change data in the fourth format without approval from the designing side;

a step of converting each received piece of the design change data in the fourth format to each piece of design change data in the third format;

a step of storing each converted piece of the design change data in the third format in the storage device together with the design data in the third format; and a step of centrally managing the stored design data in the third format and the stored design change data in the third format that includes pieces of data respectively corresponding to the first producer;

wherein the third format is a format in which structure of parts information related to a plurality of parts required to produce the product is hierarchically managed by using respective codes of the plurality of parts;

the structure is managed as one record in which data indicating an upper part that is in an upper hierarchy in the structure includes master data comprising various types of data relating to a lower part that is in a lower hierarchy in the structure; and the master data is included in the data indicating the upper part in a manner being combined with the code of the lower part.

2. The storage medium according to claim 1, wherein the predetermined language is an Extensible Markup Language.

3. A computer-readable portable storage medium storing a design data trace program to direct a computer to provide tracing function for the design data in the third format and the design change data in the third format of claim 1, the program comprising:

a step of reading from the storage device both of the design data in the third format and the design change data in the third format;

a step of retrieving the read design data in the third format and the read design change data in the third format based on a given retrieval condition, and displaying a retrieval result as a design data change history on a screen of a display device.

4. The storage medium according to claim 3, wherein the predetermined language is an Extensible Markup Language.

5. A design data managing method to manage design data generated at a designing side of a product to be produced at a production side based on the design data, comprising:

converting the design data generated at the designing side in a first format to design data in a second format that is applicable to the production side;

transmitting the design data in the second format to the production side;

converting the design data in the first format to design data in a third format that is described in a predetermined language;

storing the design data in the third format in a storage device;

changing the design data in the second format at the production side and producing the product with the changed data without approval from the designing side;

sending to the storage device, from the production side, design change data in a fourth format that indicates the change to the design data in the second format;

converting the design change data in the fourth format to design change data in the third format;

storing the design change data in the third format in the storage device with the design data in the third format; and centrally managing the stored design data in the third format and the stored design change data in the third format that includes pieces of data respectively corresponding to the first producer;

wherein the third format is a format in which structure of parts information related to a plurality of parts required to produce the product is hierarchically managed by using respective codes of the pluraliy of parts;

the structure is managed as one record in which data indicating an upper part that is in an upper hierarchy in the structure includes master data comprising various types of data relating to a lower part that is in a lower hierarchy in the structure; and the master data is included in the data indicating the upper part in a manner being combined with the code of the lower part.

\* \* \* \* \*